United States Patent
Mortazavi et al.

(10) Patent No.: US 11,403,954 B2
(45) Date of Patent: Aug. 2, 2022

(54) COMPUTING FRAMEWORK FOR BATCH ROUTING OF AUTONOMOUS VEHICLES

(71) Applicants: Nissan North America, Inc., Franklin, TN (US); Renault S.A.S., Boulogne-Billancourt (FR)

(72) Inventors: Ali Mortazavi, Walnut Creek, CA (US); Liam Pedersen, San Francisco, CA (US); Maarten Sierhuis, San Francisco, CA (US)

(73) Assignees: Nissan North America, Inc., Franklin, TN (US); Renault S.A.S., Boulogne-Billancourt (FR)

(*) Notice: Subject to any disclaimer, the term of this patent is extended or adjusted under 35 U.S.C. 154(b) by 190 days.

(21) Appl. No.: 16/965,500

(22) PCT Filed: Jan. 31, 2018

(86) PCT No.: PCT/US2018/016194
§ 371 (c)(1),
(2) Date: Jul. 28, 2020

(87) PCT Pub. No.: WO2019/152014
PCT Pub. Date: Aug. 8, 2019

(65) Prior Publication Data
US 2021/0125500 A1 Apr. 29, 2021

(51) Int. Cl.
*G08G 1/00* (2006.01)
*G08G 1/01* (2006.01)
(Continued)

(52) U.S. Cl.
CPC .............. *G08G 1/22* (2013.01); *G08G 1/0133* (2013.01); *G08G 1/0145* (2013.01); *G08G 1/096725* (2013.01); *G08G 1/096844* (2013.01)

(58) Field of Classification Search
CPC ....... G08G 1/096844; G08G 1/096725; G08G 1/0145; G08G 1/0133; G08G 1/22
See application file for complete search history.

(56) References Cited

U.S. PATENT DOCUMENTS

| 9,536,427 B2 | 1/2017 | Tonguz et al. |
| 9,576,480 B1 | 2/2017 | Shoshan |

(Continued)

FOREIGN PATENT DOCUMENTS

| JP | 2002-099982 A | 4/2002 |
| JP | 2009-128065 A | 6/2009 |

(Continued)

OTHER PUBLICATIONS

Federal Motor Vehicle Safety Standards; Jan. 17, 2017; Federal Register, vol. 82, No. 008, pp. 3854-3904.

(Continued)

*Primary Examiner* — Luis A Martinez Borrero
(74) *Attorney, Agent, or Firm* — Young Basile Hanlon & MacFarlane, P.C.

(57) ABSTRACT

Batch routing of autonomous vehicles is disclosed. A method may include maintaining a plurality of vehicle state data object instances that respectively correspond to a plurality of autonomous vehicles. The method includes obtaining a traffic condition location and determining a group of autonomous vehicles from the plurality of autonomous vehicles where the current route of each autonomous vehicle intersects the traffic condition location. The method also includes determining two or more subgroups of autonomous vehicles, and for each subgroup, determining a respective avoidance waypoint corresponding to the subgroup that is not on the current route of the autonomous vehicle. For each autonomous vehicle in the subgroup, the method includes determining an updated route based on the current route of the autonomous vehicle and the respective avoidance way- (Continued)

point, generating a control instruction based on the updated route, and transmitting the control instruction to the autonomous vehicle.

16 Claims, 7 Drawing Sheets

(51) Int. Cl.
*G08G 1/0967* (2006.01)
*G08G 1/0968* (2006.01)

(56) References Cited

U.S. PATENT DOCUMENTS

| | | | |
|---|---|---|---|
| 9,603,158 B1* | 3/2017 | Ross | H04L 67/04 |
| 9,659,496 B2 | 5/2017 | Massey et al. | |
| 9,792,575 B2* | 10/2017 | Khasis | G08G 1/0112 |
| 9,805,601 B1* | 10/2017 | Fields | G08G 1/096844 |
| 9,947,224 B2* | 4/2018 | Fairfield | B60W 30/00 |
| 9,953,523 B2* | 4/2018 | Linder | G08G 1/0133 |
| 10,019,901 B1* | 7/2018 | Fields | G06K 9/6256 |
| 10,032,373 B2* | 7/2018 | Fletcher | B60W 30/18154 |
| 10,354,217 B2* | 7/2019 | Khasis | G08G 1/0129 |
| 10,916,142 B2* | 2/2021 | Fairfield | G08G 1/0112 |
| 10,994,748 B2* | 5/2021 | Mortazavi | G06K 9/6256 |
| 11,042,827 B2* | 6/2021 | Khasis | G08G 1/012 |
| 2009/0326991 A1* | 12/2009 | Wei | G06Q 10/08355 705/5 |
| 2016/0231746 A1 | 8/2016 | Hazelton et al. | |
| 2016/0247106 A1 | 8/2016 | Dalloro et al. | |
| 2017/0069209 A1* | 3/2017 | Beaurepaire | G08G 1/0125 |
| 2017/0113689 A1 | 4/2017 | Gordon et al. | |
| 2017/0132334 A1 | 5/2017 | Levinson et al. | |
| 2017/0154529 A1 | 6/2017 | Zhao et al. | |
| 2017/0208128 A1 | 7/2017 | Stenneth et al. | |
| 2017/0262790 A1* | 9/2017 | Khasis | G08G 1/0116 |
| 2017/0262908 A1* | 9/2017 | Wei | G06Q 10/02 |
| 2017/0276492 A1 | 9/2017 | Ramasamy | |
| 2017/0278390 A1 | 9/2017 | Zydek et al. | |
| 2017/0308759 A1 | 10/2017 | Mullen | |
| 2017/0309172 A1* | 10/2017 | Linder | G08G 1/0133 |
| 2017/0323249 A1* | 11/2017 | Khasis | G01C 21/3492 |
| 2017/0351992 A1* | 12/2017 | Khasis | G08G 1/20 |
| 2017/0359197 A1* | 12/2017 | Stolfus | H04L 47/122 |
| 2018/0003516 A1* | 1/2018 | Khasis | G08G 1/207 |
| 2018/0017401 A1* | 1/2018 | Fletcher | G01C 21/3617 |
| 2018/0090001 A1* | 3/2018 | Fletcher | G08G 1/096725 |
| 2018/0211521 A1* | 7/2018 | Linder | G08G 1/0116 |
| 2018/0329428 A1* | 11/2018 | Nagy | G08G 1/0145 |
| 2019/0122543 A1* | 4/2019 | Matus | G08G 1/0133 |
| 2019/0325376 A1* | 10/2019 | Khasis | G08G 1/0112 |
| 2019/0376800 A1* | 12/2019 | Pedersen | G05D 1/0011 |
| 2020/0004239 A1* | 1/2020 | Pedersen | G08G 1/0133 |
| 2020/0021961 A1* | 1/2020 | Li | G05D 1/0022 |
| 2020/0151291 A1* | 5/2020 | Bhattacharyya | G06N 5/04 |
| 2021/0001882 A1* | 1/2021 | Mortazavi | G08G 1/096783 |
| 2021/0312375 A1* | 10/2021 | Khasis | G08G 1/0145 |

FOREIGN PATENT DOCUMENTS

| | | |
|---|---|---|
| JP | 2011-203828 A | 10/2011 |
| JP | 2016-106231 A | 6/2016 |
| JP | 2017-033096 A | 2/2017 |

OTHER PUBLICATIONS

Qualcomm and LG Bring 5G and Cellular-V2X Communications Into Vehicles; Feb. 23, 2017; PR Newswire Association LLC; pp. 1-3.; https://www.qualcomm.com/news/releases/2017/02/23/qualcomm-and-lg-bring-5g-and-cellular-v2x-communications-vehicles.

* cited by examiner

COMPUTING FRAMEWORK FOR BATCH ROUTING OF AUTONOMOUS VEHICLES

CROSS-REFERENCE TO RELATED APPLICATION(S)

This application is a national stage 371 filing of International Application Serial No. PCT/US2018/016194, filed Jan. 31, 2018, the entire disclosure of which is hereby incorporated by reference.

TECHNICAL FIELD

This application relates generally to autonomous vehicles, and more particularly to a computing framework for batch routing of autonomous vehicles.

BACKGROUND

The use of autonomous vehicles has not eliminated the occurrence of situations (e.g., construction zones) that can delay or obstruct transit of the vehicles. For example, accidents may cause certain locations along a vehicle transportation network to become congested. Given a route, an autonomous vehicle may be delayed from reaching its destination. Without the ability to reroute, the autonomous vehicle may be unable to advance towards its destination until the situation is resolved. Given the ability to reroute, all the autonomous vehicles that are in the congested area may all reroute themselves to the same waypoints, thereby causing additional congestion.

SUMMARY

Disclosed herein are aspects, features, elements, implementations, and implementations for generation of solution path overlay interfaces.

According to some implementations of the present disclosure, a method for batch routing of autonomous vehicles is disclosed. According to these implementations, the method may include maintaining, by one or more processors of a vehicle control server, a plurality of vehicle state data object instances that respectively correspond to a plurality of autonomous vehicles traversing a vehicle transportation network. Each vehicle state data object instance indicates a current location corresponding to a current location of the respective autonomous vehicle and a current route of the respective autonomous vehicle. The method further includes obtaining, by the one or more processors, a traffic condition location. The traffic condition location indicates a location along the vehicle transportation network where traffic is currently impeded. The method also includes determining, by the one or more processors, a group of autonomous vehicles from the plurality of autonomous vehicles based on the traffic condition location and the current route defined in each of the plurality of vehicle state data object instances. The group of autonomous vehicles includes autonomous vehicles where the current route of the autonomous vehicle intersects the traffic condition location. The method also includes determining, by the one or more processors, two or more subgroups of autonomous vehicles including a first subgroup of autonomous vehicles and a second subgroup of autonomous vehicles from the group of autonomous vehicles based on the plurality of vehicle state data object instances. The method also includes, for each subgroup of autonomous vehicles of the two or more subgroups, determining, by the one or more processors, a respective avoidance waypoint corresponding to the subgroup, wherein the respective avoidance waypoint defines a respective geolocation that is not on the current route of any of the autonomous vehicles in the subgroup of autonomous vehicles and is different from respective waypoints of each other subgroup of autonomous vehicles of the two or more subgroups. For each autonomous vehicle in the subgroup, the method includes determining, by the one or more processors, an updated route based on the current route of the autonomous vehicle and the respective avoidance waypoint, wherein the updated route does not intersect traffic condition location. For each autonomous vehicle in the subgroup, the method includes generating, by the one or more processors, a control instruction based on the updated route and transmitting, by the one or more processors, the control instruction to the autonomous vehicle. The control instruction causes the autonomous vehicle to travel to the respective avoidance waypoint.

According to some implementations of the present disclosure, determining the group of autonomous vehicles includes identifying any autonomous vehicles having a respective current route that intersects the traffic condition location. Furthermore, for each of the identified autonomous vehicles, the method includes determining whether the identified autonomous vehicle is eligible to be rerouted to avoid the traffic condition location; and when the identified autonomous vehicle is eligible to be rerouted, including a reference to the identified autonomous vehicle in the group of autonomous vehicles.

According to some implementations of the present disclosure, determining the two or more subgroups of autonomous vehicles includes for each autonomous vehicle in the group of autonomous vehicles, assigning a priority value to the autonomous vehicle based on the vehicle state data object instance of the autonomous vehicle, and generating the two or more subgroups based on the respective priority values of each autonomous vehicle in the group of autonomous vehicles.

According to some implementations of the present disclosure, for each respective autonomous vehicle in the plurality of autonomous vehicles, the respective vehicle state data object instance of the respective autonomous vehicle includes a vehicle task indicator indicating an intended task of the respective autonomous vehicle, and wherein the priority value of each respective autonomous vehicle in the group of autonomous vehicles is based on the vehicle task indicator included in the vehicle state data object instance of the respective autonomous vehicle.

According to some implementations of the present disclosure, for each respective autonomous vehicle in the plurality of autonomous vehicles, the respective vehicle state object instance of the respective autonomous vehicle includes a passenger value indicating a number of passengers in the respective autonomous vehicle, and wherein the priority value of each respective autonomous vehicle in the group of autonomous vehicles is based on the passenger value included in the vehicle state data object instance of the respective autonomous vehicle.

According to some implementations of the present disclosure, for each respective autonomous vehicle in the plurality of autonomous vehicles, the respective vehicle state object instance of the respective autonomous vehicle includes a charge value indicating a remaining amount of charge in a vehicle power supply of the respective autonomous vehicle, and wherein the priority value of each respective autonomous vehicle in the group of autonomous vehicles is based on the charge value included in the vehicle state data object instance of the respective autonomous vehicle.

According to some implementations of the present disclosure, the method further includes instantiating, by the one or more processors, a new vehicle state data object instance corresponding to an autonomous vehicle upon determining that the autonomous vehicle is traversing the vehicle transportation network, receiving, by the one or more processors, new vehicle state data from the autonomous vehicle, and updating, by the one or more processors, the new vehicle state data object instance with the new vehicle state data.

According to some implementations of the present disclosure, each vehicle state data object instance is a container.

According to some implementations of the present disclosure, the method further includes for each autonomous vehicle in each respective subgroup, replacing, by the one or more processors, the current route of the autonomous vehicle with the updated route in the vehicle state data object instance of the autonomous vehicle.

According to some implementations of the present disclosure, obtaining the traffic condition location includes determining, by the one or more processors, that two or more autonomous vehicles from the plurality of autonomous vehicles are traversing a same portion of the vehicle transportation network at a velocity that is less than an expected velocity.

According to some implementations a controller apparatus configured to batch route autonomous vehicles is disclosed. The controller apparatus includes a storage system, a communication unit communicates with a plurality of autonomous vehicles via a communication network, and a processing system that includes one or more processors that execute computer-readable instructions. The computer-readable instructions cause the one or more processors to maintain a plurality of vehicle state data object instances that respectively correspond to the plurality of autonomous vehicles traversing a vehicle transportation network. Each vehicle state data object instance indicates a current location corresponding to a current location of the respective autonomous vehicle and a current route of the respective autonomous vehicle. The computer-readable instructions further cause the one or more processors to obtain a traffic condition location. The traffic condition location indicates a location along the vehicle transportation network where traffic is currently impeded. The computer-readable instructions further cause the one or more processors to determine a group of autonomous vehicles from the plurality of autonomous vehicles based on the traffic condition location and the current route defined in each of the plurality of vehicle state data object instances, wherein the group of autonomous vehicles includes autonomous vehicles where the current route of the autonomous vehicle intersects the traffic condition location. The computer-readable instructions further cause the one or more processors to determine two or more subgroups of autonomous vehicles including a first subgroup of autonomous vehicles and a second subgroup of autonomous vehicles from the group of autonomous vehicles based on the plurality of vehicle state data object instances. The computer-readable instructions further cause the one or more processors, for each subgroup of autonomous vehicles of the two or more subgroups, determine a respective avoidance waypoint corresponding to the subgroup, wherein the respective avoidance waypoint defines a respective geolocation that is not on the current route of any of the autonomous vehicles in the subgroup of autonomous vehicles and is different from respective waypoints of each other subgroup of autonomous vehicles of the two or more subgroups. Furthermore, for each autonomous vehicle in the subgroup, the computer-readable instructions further cause the one or more processors to determine an updated route based on the current route of the autonomous vehicle and the respective avoidance waypoint, generate a control instruction based on the updated route, and transmit the control instruction to the autonomous vehicle, wherein the control instruction causes the autonomous vehicle to travel to the respective avoidance waypoint. The updated route does not intersect traffic condition location.

According to some implementations of the present disclosure, determining the group of autonomous vehicles includes identifying any autonomous vehicles having a respective current route that intersects the traffic condition location. Furthermore, for each of the identified autonomous vehicles, the method includes determining whether the identified autonomous vehicle is eligible to be rerouted to avoid the traffic condition location; and when the identified autonomous vehicle is eligible to be rerouted, including a reference to the identified autonomous vehicle in the group of autonomous vehicles.

According to some implementations of the present disclosure, determining the two or more subgroups of autonomous vehicles includes for each autonomous vehicle in the group of autonomous vehicles, assigning a priority value to the autonomous vehicle based on the vehicle state data object instance of the autonomous vehicle, and generating the two or more subgroups based on the respective priority values of each autonomous vehicle in the group of autonomous vehicles.

According to some implementations of the present disclosure, for each respective autonomous vehicle in the plurality of autonomous vehicles, the respective vehicle state data object instance of the respective autonomous vehicle includes a vehicle task indicator indicating an intended task of the respective autonomous vehicle, and wherein the priority value of each respective autonomous vehicle in the group of autonomous vehicles is based on the vehicle task indicator included in the vehicle state data object instance of the respective autonomous vehicle.

According to some implementations of the present disclosure, for each respective autonomous vehicle in the plurality of autonomous vehicles, the respective vehicle state object instance of the respective autonomous vehicle includes a passenger value indicating a number of passengers in the respective autonomous vehicle, and wherein the priority value of each respective autonomous vehicle in the group of autonomous vehicles is based on the passenger value included in the vehicle state data object instance of the respective autonomous vehicle.

According to some implementations of the present disclosure, for each respective autonomous vehicle in the plurality of autonomous vehicles, the respective vehicle state object instance of the respective autonomous vehicle includes a charge value indicating a remaining amount of charge in a vehicle power supply of the respective autonomous vehicle, and wherein the priority value of each respective autonomous vehicle in the group of autonomous vehicles is based on the charge value included in the vehicle state data object instance of the respective autonomous vehicle.

According to some implementations of the present disclosure, the instructions further cause the one or more processors to instantiate a new vehicle state data object instance corresponding to an autonomous vehicle upon determining that the autonomous vehicle is traversing the vehicle transportation network, receive new vehicle state data from the autonomous vehicle, and update the new vehicle state data object instance with the new vehicle state data.

According to some implementations of the present disclosure, each vehicle state data object instance is a container.

According to some implementations of the present disclosure, the instructions further cause the one or more processors to, for each autonomous vehicle in each respective subgroup, replace the current route of the autonomous vehicle with the updated route in the vehicle state data object instance of the autonomous vehicle.

According to some implementations of the present disclosure, obtaining the traffic condition location includes determining, by the one or more processors, that two or more autonomous vehicles from the plurality of autonomous vehicles are traversing a same portion of the vehicle transportation network at a velocity that is less than an expected velocity.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
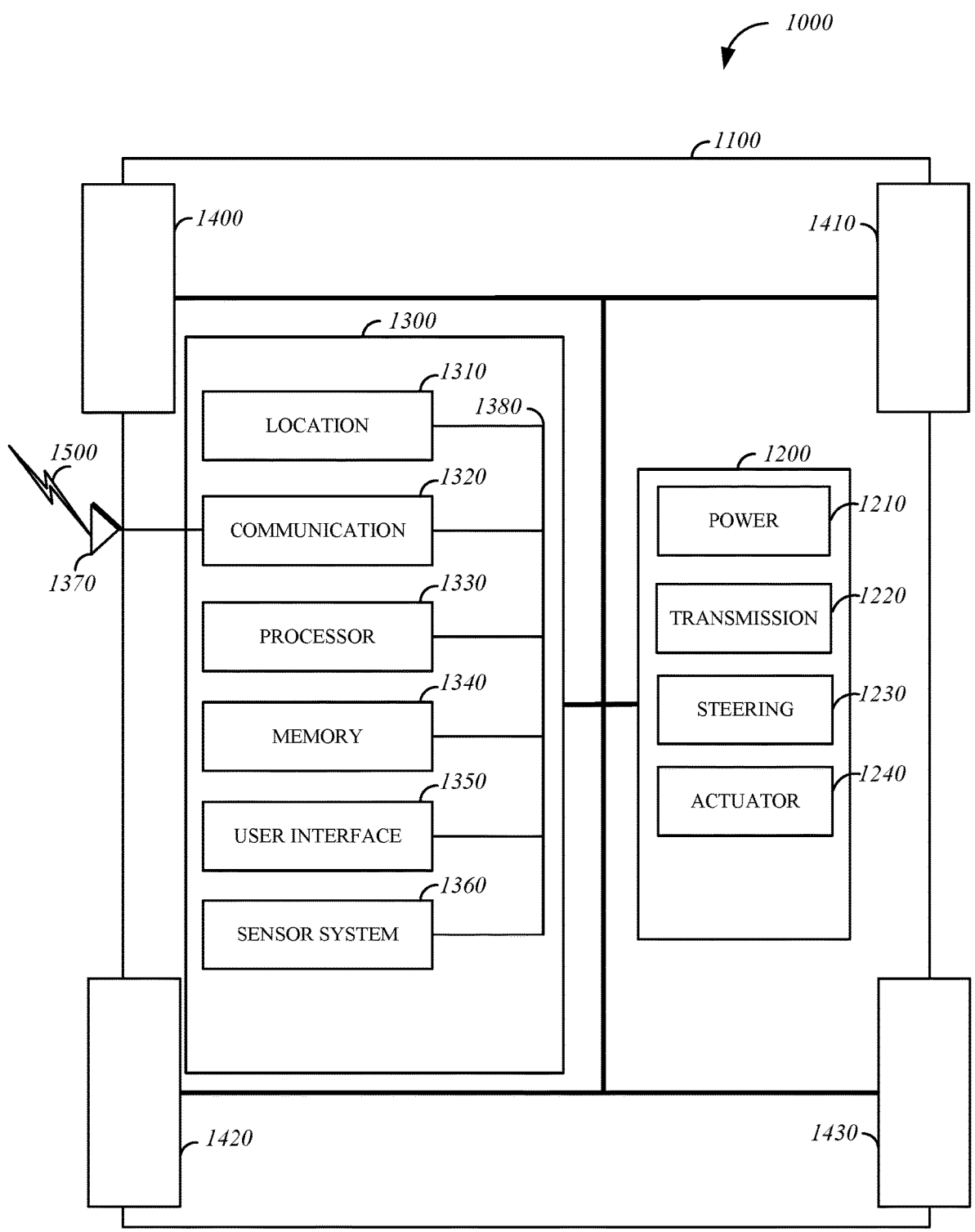
FIG. 1 is a schematic of an example of a portion of a vehicle in which the aspects, features, and elements disclosed herein may be implemented.

The present disclosure is directed to a system and methods for batch routing of autonomous vehicles (or "vehicles"). The system is configured to maintain vehicle state data for a collection of autonomous vehicles traveling along a vehicle transportation network (or "transportation network"). A transportation network may refer to a structure that permits vehicular movement (e.g., a road, street, highway, etc.). The vehicle state data may include, but is not limited to, a current location of the autonomous vehicle, a route of the vehicle, a destination of the vehicle, the velocity or speed of the vehicle, the function or task of the vehicle (e.g., passenger drop-off, passenger pickup, unmanned relocation of the vehicle, charging, commercial shipping, delivery, etc.), the number of passengers in the vehicle, and/or whether there are any passengers in the vehicle. In some implementations, each autonomous vehicle may have a priority value associated with it. The priority value may be indicative of a relative priority of the autonomous vehicle relative to other autonomous vehicles. For example, a passenger vehicle performing a drop-off may have a higher priority than a delivery vehicle that is delivering goods to a business. In some implementations, the system may instantiate an instance of a vehicle state data object for each autonomous vehicle on the transportation network with which the system communicates. Each instance may maintain the vehicle state data of a respective autonomous vehicle.

The system is further configured to determine the existence of a traffic condition. A traffic condition may refer to any condition that may impede one or more vehicles along a vehicle transportation network. A traffic condition location may refer to a location corresponding to the traffic condition. In response to detection of a traffic condition, the system may identify a group of autonomous vehicles having routes that intersect the traffic condition location. The system may then generate two or more subgroups of autonomous vehicles from the group of autonomous vehicles. In some implementations, the system may generate the subgroups based on the priorities of the autonomous vehicles in the group of autonomous vehicles. For each subgroup, the system may determine a different avoidance waypoint. An avoidance waypoint may be a geolocation that is not on the current route of the vehicles. Put another way, an avoidance waypoint may define a waypoint that avoids the traffic condition location. Then for each autonomous vehicle in each subgroup, the system may determine an updated route for the vehicle based on the avoidance waypoint. Each updated route is communicated to a respective autonomous vehicle. In this way, the group of autonomous vehicles are routed to avoid the traffic condition, but in a manner that avoids routing all the vehicles to the same avoidance waypoint.

Implementations of this disclosure provide technological improvements particular to controlling and routing autonomous vehicles, for example, those concerning the extension of computer network components to remotely monitor and tele-operate autonomous vehicles. The development of new ways to monitor autonomous vehicle network resources to, for example, identify obstacles and communicating instructions or information between the monitoring devices and the vehicles is fundamentally related to autonomous vehicle related computer networks.

Implementations of this disclosure provide at least a system, an apparatus, non-transitory computer readable media, and a method for the generation of a solution path overlay interface. The system includes receiving vehicle state data and external data associated with a vehicle, for example from a remote data source (e.g., remote vehicle monitoring server) through a communication system in the vehicle. The vehicle state data can relate to the state of the vehicle, including the vehicle's current location, intended destination, the current route of the vehicle, the speed of the vehicle, the number of passengers (if any) in the vehicle, a task of the vehicle, and/or operational status. The external data can relate to the state of external objects, including the locations of the external objects and movement paths of the external objects (e.g., routes that the external objects have travelled and are predicted to travel).

To describe some implementations in greater detail, reference is made to the following figures.

FIG. 1 is a diagram of an example of an autonomous vehicle 1000 (also referred to as "vehicle" 1000) in which the aspects, features, and elements disclosed herein may be implemented. The vehicle 1000 includes a chassis 1100, a powertrain 1200, a controller 1300, wheels 1400/1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor system 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor system 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor system 1360, the powertrain 1200, or any combination thereof. For example, the processor 1330 may be operatively coupled with the memory 1340 via a communication bus 1380.

In some embodiments, the processor 1330 may be configured to execute instructions including instructions for remote operation which may be used to operate the vehicle 1000 from a remote location including the operations center. The instructions for remote operation may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short-range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of being used as an interface by a person, including any of a virtual keypad, a physical keypad, a touchpad, a display, a touchscreen, a speaker, a microphone, a video camera, and a sensor. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor system 1360 may include one or more sensors, such as an array of sensors, which may be operable to provide information that may be used to control the vehicle. The sensor system 1360 can provide information regarding current operating characteristics of the vehicle or its surrounding. The sensor system 1360 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensor system 1360 may include sensors that are operable to obtain information regarding the physical environment surrounding the vehicle 1000. For example, one or more sensors detect road geometry and obstacles, such as fixed obstacles, vehicles, cyclists, and pedestrians. In some embodiments, the sensor system 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor system 1360 and the location unit 1310 are combined.

Although not shown separately, the vehicle 1000 may include a vehicle control system. For example, the controller 1300 may include a vehicle control system. The vehicle control system may be operable to obtain information describing a current state of the vehicle 1000 and a route planned for the vehicle 1000, and, based on this information, to determine and optimize a trajectory for the vehicle 1000. In some embodiments, the vehicle control system outputs signals operable to control the vehicle 1000 such that the vehicle 1000 follows the trajectory that is determined by the vehicle control system. For example, the output of the vehicle control system can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
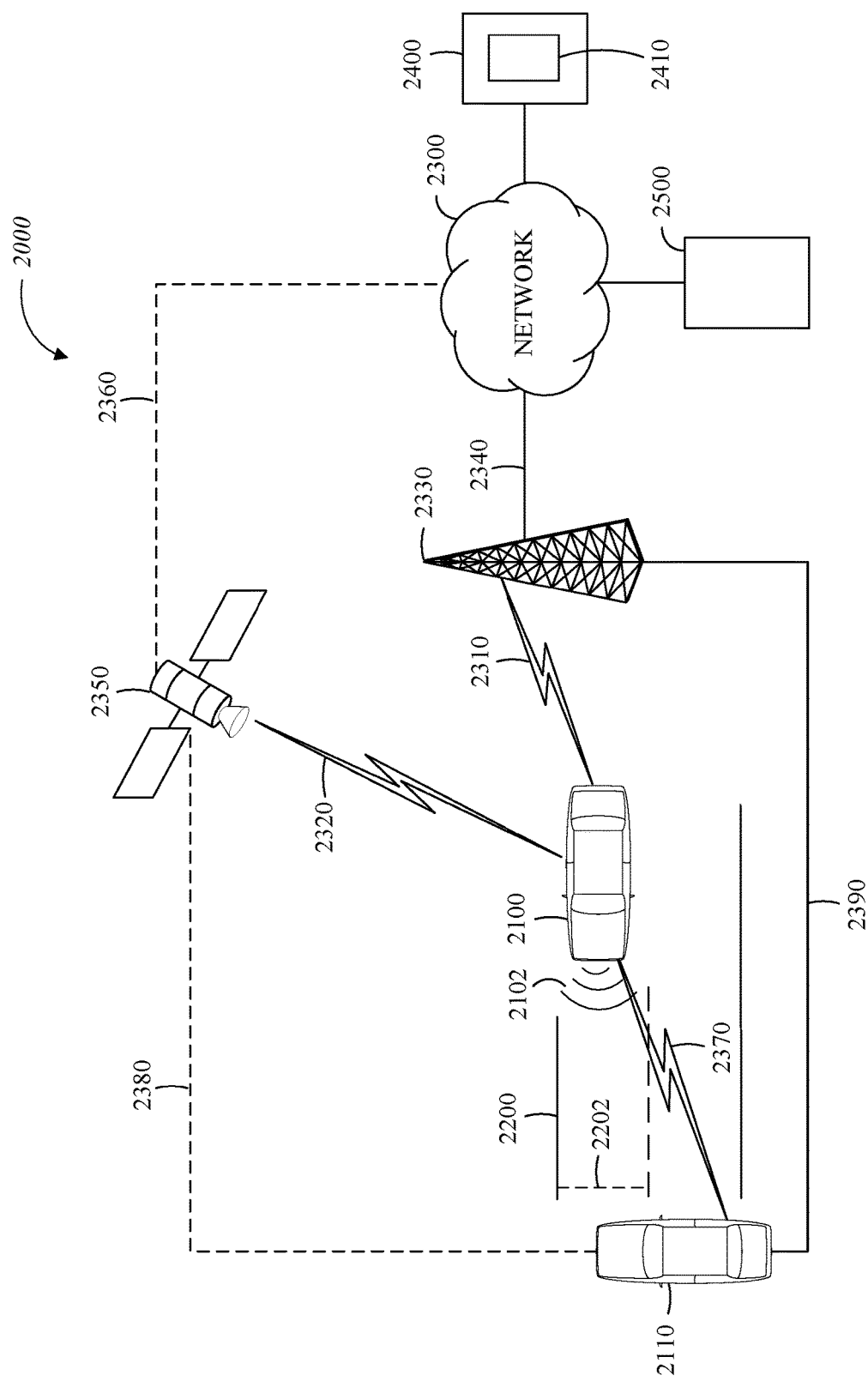
FIG. 2 is a schematic of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments, the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles. The controller apparatus 2410 may monitor the vehicle state data of any vehicle in communication with the controller apparatus 2410. The controller apparatus 2410 may maintain the vehicle state of each vehicle, and may determine a route for each vehicle based on the vehicle state of the vehicle. Furthermore, the controller apparatus can monitor the vehicle state data of a collection of vehicles to detect the occurrence of a traffic condition (e.g., a traffic jam). Upon determining the occurrence of a traffic condition, the controller apparatus 2410 groups vehicles that are likely to encounter the traffic condition (i.e., vehicles whose routes intersect the traffic condition) into different subgroups based on one or more factors. The different subgroups are then rerouted through different waypoints, so as to efficiently route the vehicles around the traffic condition. The controller apparatus 2410 can receive vehicle state data and external data including any of: vehicle velocity; vehicle location; vehicle operational state; vehicle destination; vehicle route;

vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor system 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3A:
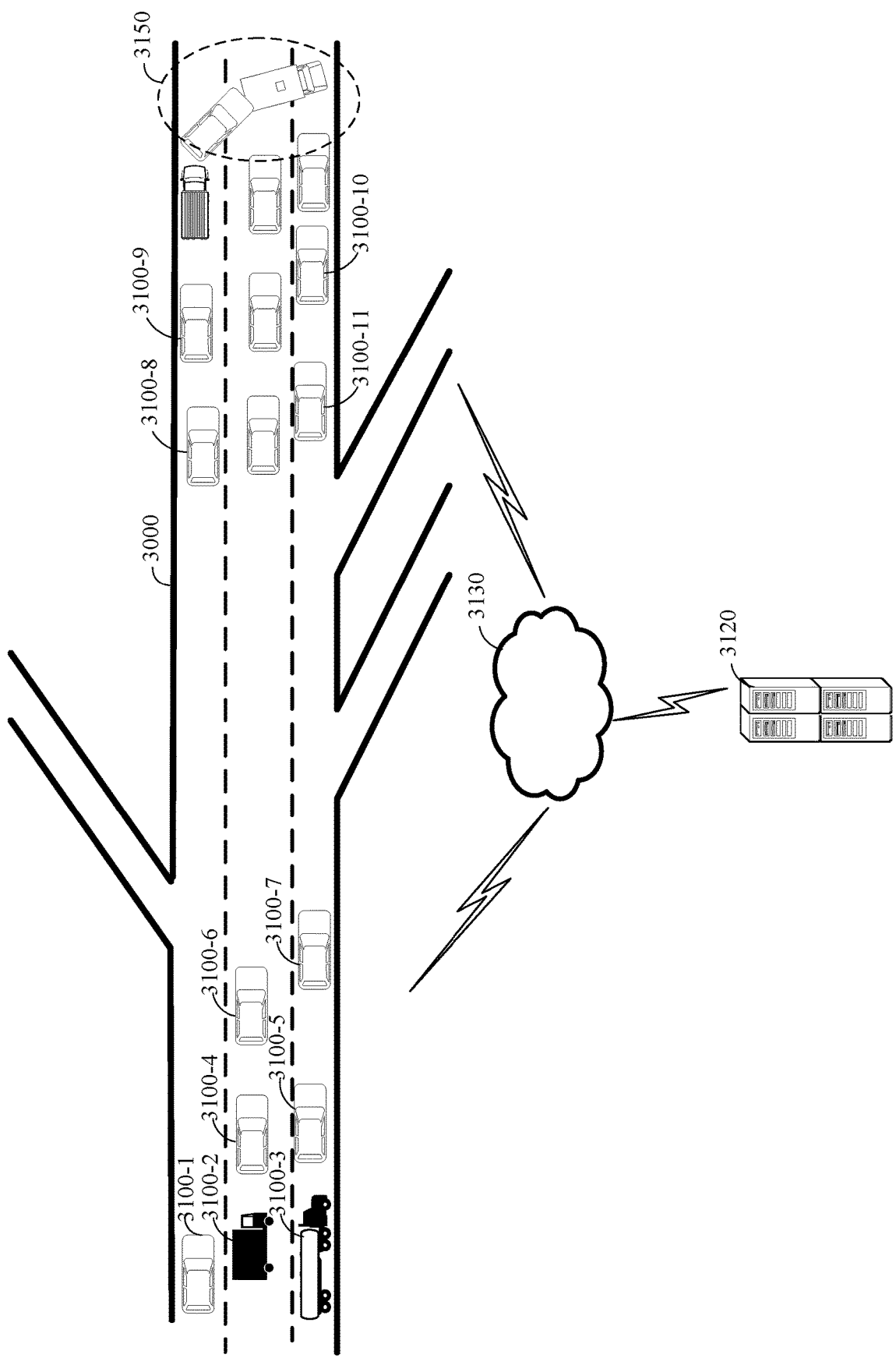
FIGS. 3A and 3B illustrate an example group of autonomous vehicles traversing a vehicle transportation network according to some implementations of the present disclosure.
Figure 3B:
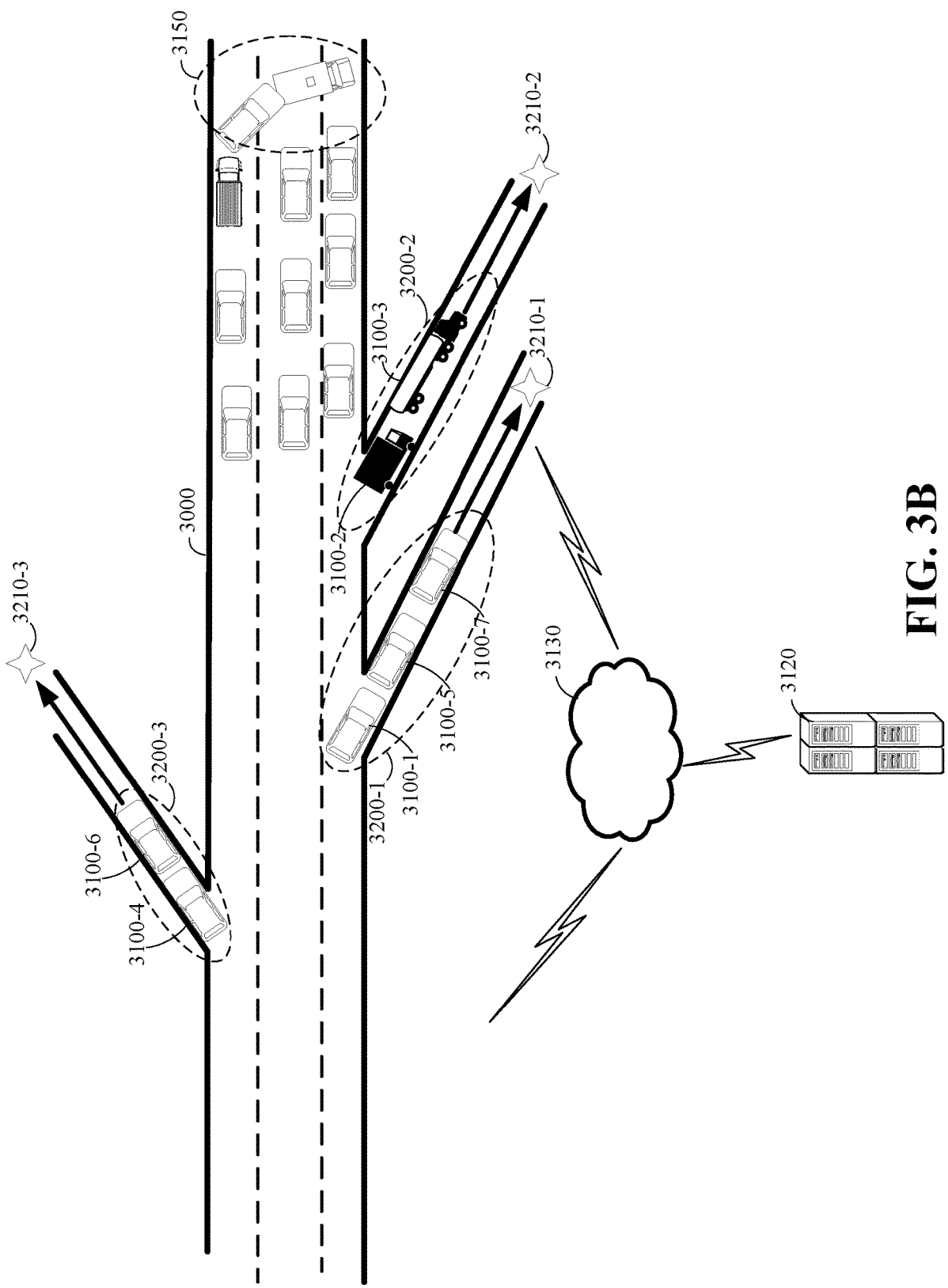

FIGS. 3A and 3B illustrate an example group of autonomous vehicles 3100-1, 3100-2 . . . 3100-10 (generically referred to as "autonomous vehicles 3100" or "vehicles 3100") traversing a vehicle transportation network 3000 (or "transportation network 3000"). In the example of FIGS. 3A-3B, a controller apparatus 3120 (e.g., controller apparatus 2410 of FIG. 2) receives vehicle state data (not shown) from the autonomous vehicles 3100 via a communication network 3130. In response to the received vehicle state data, the controller apparatus 3120 may determine the occurrence of a traffic condition 3150. For example, autonomous vehicles 3100-8, 3100-9, 3100-10, and 3100-11 may report vehicle state data that indicates that the relative position of the autonomous vehicles has not moved or are moving very slowly on a portion of the transportation network 3000 that is typically associated with high speed travel (e.g., a highway). Additionally or alternatively, the controller apparatus 3120 may receive external data from one or more non-vehicles (e.g., video cameras, internet of things (JOT) beacons, and/or IOT road sensors) to determine that there is a traffic condition 3150. In response to the vehicle state data and/or external data the controller apparatus 3120 determines the existence of a traffic condition 3150 and an approximate geolocation of the traffic condition 3150. For example, by monitoring the vehicle state data from a plurality of autonomous vehicles 3100, the controller apparatus 3120 may determine that a collection of autonomous vehicles 3100 are not moving. In this example, the controller apparatus 3120 may determine that vehicles 3100-8, 3100-9, 3100-10, and 3100-11 are not moving or are moving well below the expected speeds on the illustrated portion of the transportation network 3000. The controller apparatus 3120 may determine an approximate location (e.g., a latitude and longitude) of the traffic condition 3150 based on the respective locations of the non-moving or slowed autonomous vehicles 3100-8, 3100-9, 3100-10, and 3100-11.

In response to detecting a traffic condition 3150, the controller apparatus 3120 may identify a group of autonomous vehicles that may be rerouted. Determining the group of autonomous vehicles that may be rerouted includes identifying i) any autonomous vehicles 3100 that have a respective route that intersect the geolocation of the traffic condition and ii) of the identified autonomous vehicles 3100, any autonomous vehicles 3100 that are able to avoid the traffic condition. For instance, if an autonomous vehicle 3100-1 has a route that intersects the traffic condition 3150 and there is an exit or turn that can be taken by the autonomous vehicle 3100-1, then the controller apparatus 3120 includes the autonomous vehicle 3100-1 in the group of vehicles. If, however, an autonomous vehicle 3100-10 has a route that does intersect the traffic condition 3150 but cannot exit or otherwise avoid the traffic condition 3150, the controller apparatus 3120 does not include the autonomous vehicle 3100-10 in the group of autonomous vehicles. In the example of FIG. 3A, vehicles 3100-1, 3100-2, 3100-3, 3100-4, 3100-5, 3100-6, 3100-7 may be included in the group of autonomous vehicles.

In response to determining the group of autonomous vehicles 3100, the controller apparatus 3120 determines two or more subgroups of autonomous vehicles 3100 based on one or more features of the autonomous vehicles. In some implementations, the controller apparatus 3120 determines a priority value for each vehicle in the group of autonomous vehicles. For example, in FIG. 3A the controller apparatus 3120 may obtain priority values for each of the autonomous vehicles 3100-1, 3100-2, 3100-3, 3100-4, 3100-5, 3100-6, 3100-7 that are included in the group. The priority value may be assigned ahead of being included in the group (e.g., upon the autonomous vehicle beginning a route) or after being included in a group. The priority value of an autonomous vehicle 3100 may be based on one or more features of the autonomous vehicle. The features may include a number of passengers (if any) in the autonomous vehicle 3100, the intended task of the autonomous vehicle 3100 (e.g., passenger drop off, delivery, parking, or charging), whether the autonomous vehicle 3100 needs to be charged or fueled, an urgency value requested by a passenger, or the like. Upon obtaining the priority values of the autonomous vehicles 3100 in the group, the controller apparatus 3120 may separate the group of autonomous vehicles 3100 into two or more subgroups based on the priority values. For instance, vehicles in a first subgroup (e.g., those with the highest priority) may be autonomous vehicles carrying passengers and that do not need to be charged. Autonomous vehicles 3100 in a second subgroup (e.g., those with intermediate priority) may be autonomous vehicles 3100 carrying no passengers and/or tasked with commercial tasks (e.g., deliveries). Autonomous vehicles 3100 in a third subgroup (e.g., those with the lowest priority) may be autonomous vehicles 3100 that need a charge or refueling.

FIG. 3B illustrates an example of the autonomous vehicles 3100 traversing the vehicle transportation network 3000 in response to controller apparatus 3120 grouping the group of autonomous vehicles 3100-1, 3100-2, 3100-3, 3100-4, 3100-5, 3100-6, 3100-7 into three different subgroups 3200-1, 3200-2, 3200-3 of autonomous vehicles 3100 (generically referred to as "subgroups 3200" or subgroups of auto). In response to determining the subgroups 3200, the controller apparatus 3120 determines a respective avoidance waypoint 3210-1, 3210-2, 3210-3 (generically referred to as "avoidance waypoints 3210"). An avoidance waypoint 3210 may define a geolocation that an updated route 3230-1, 3230-2, 3230-3 (generically referred to as an "updated route 3230") of an autonomous vehicle 3100 may intersect in order to avoid the traffic condition 3150. An updated route 3230 is a route of an autonomous vehicle 3100 that avoids a detected traffic condition 3150. In determining different avoidance waypoints 3210 for different subgroups 3200 of autonomous vehicles 3100, the controller apparatus 3120 can efficiently route vehicles to avoid creating additional traffic conditions at other points in the vehicle transportation network 3000.

In the example of FIG. 3B, the controller apparatus 3120 has routed the first subgroup 3200-1 of autonomous vehicles 3100-1, 3100-5, 3100-7 through a first avoidance waypoint 3310-1. The controller apparatus 3120 has routed the second subgroup 3200-2 of autonomous vehicles 3100-2, 3100-3 through a second avoidance waypoint 3310-2 that is different than the first avoidance waypoint 3310-1. In this example, the controller apparatus 3120 has routed the third subgroup 3200-3 of autonomous vehicles 3100-4, 3100-6 through a third traffic avoidance waypoint 3310-3 that is different than the first and second traffic avoidance waypoints 3210-1, 3210-2. In this example, the first subgroup 3200-1 may be routed along the fastest route around the traffic condition 3150. The second subgroup 3200-2 may be routed along a slower route around the traffic condition 3150. The third subgroup 3200-3 may be routed along a slower route, but a route that includes sufficient charging/refueling options. The controller apparatus 3120 may route an autonomous vehicle 3100 by transmitting a control instruction containing the updated route to the autonomous vehicle 3100.

It is noted that the foregoing example illustrates a scenario where the updated routes are selected such that the third subgroup is routed on a route that has ample charging/refueling areas. The subgroups may be rerouted to fulfill other criteria as well.

Figure 4:
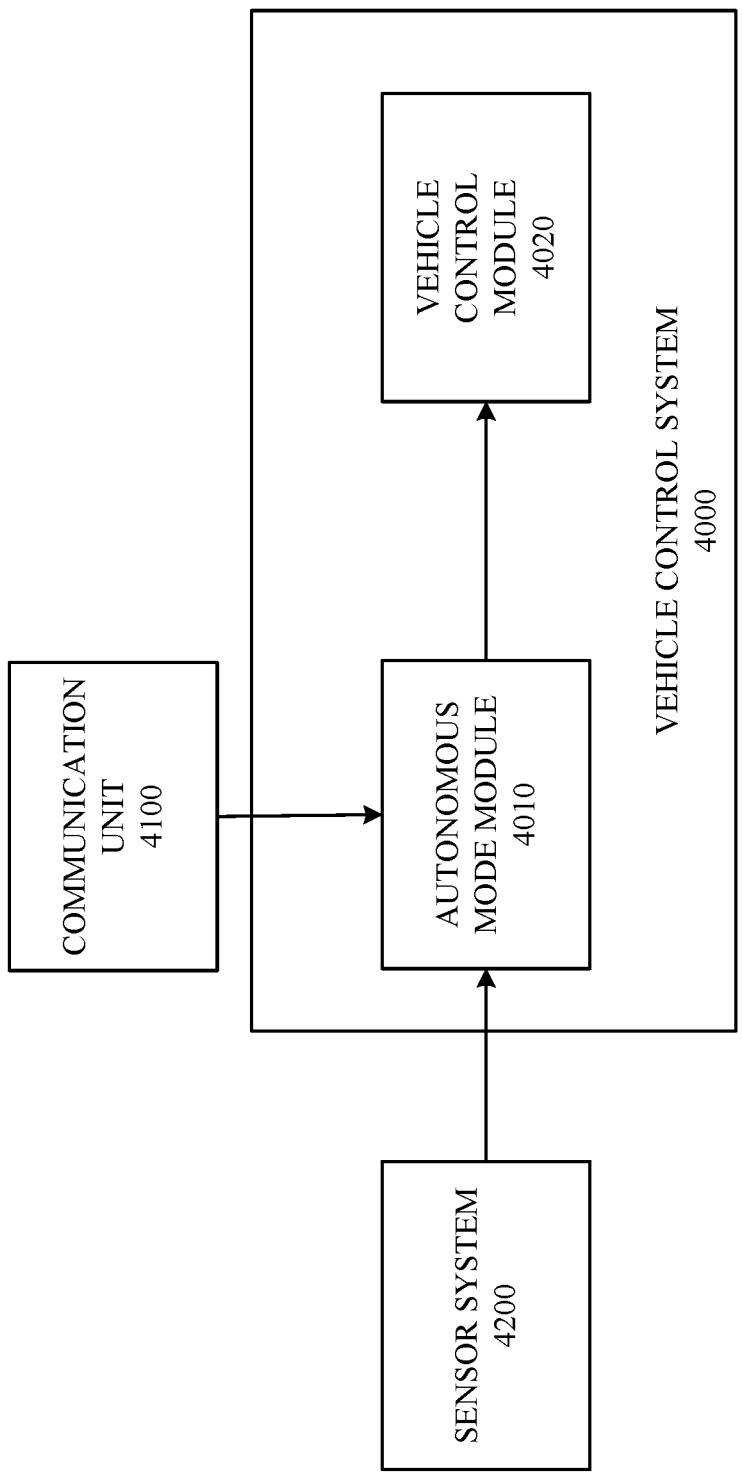
FIG. 4 is a schematic of an example vehicle control system of an autonomous vehicle according to some implementations of the present disclosure.

FIG. 4 illustrates an example vehicle control system 4000 according to some implementations of the present disclosure. The vehicle control system 4000 may be executed by one or more processors of an autonomous vehicle (e.g., processor 1330 of vehicle 1000 of FIG. 1). The vehicle control system 4000 may include an autonomous mode module 4010 and a vehicle control module 4020.

The autonomous mode module 4010 receives sensor data from a sensor system 4200 (e.g., sensor system 1360 of FIG. 1). For example, the autonomous mode module 4010 may receive sensor data from a sensor system 4200 that includes a global positioning system (GPS) sensor, optical sensors including light detection and ranging sensors (LIDAR), video sensors, audio sensors, motion sensors (e.g., accelerometers and/or gyroscopes), temperature sensors, and/or any other suitable vehicle sensors. The autonomous mode module 4010 may determine one or more actions for the autonomous vehicle based on the received sensor data. Examples of actions include accelerate, decelerate, brake, turn left, turn right, reverse, etc. In some implementations, the autonomous mode module 4010 may utilize one or more machine-learned models to determine an action given the sensor data output by the sensor system 4200. Examples of machine-learned models include neural networks, deep neural networks, hidden Markov models, partially-solved Markov models, and the like.

In some implementations, the autonomous mode module 4010 may further receive control instructions from the controller apparatus (not shown) via the communication unit 4100. A control instruction may be any communicated data that provides one or more actions to the autonomous mode on an action to be made. In some implementations, a control instruction may contain a route or an updated route for the autonomous vehicle to traverse. In response to receiving a control instruction, the autonomous mode module 4010 may determine one or more actions based on the control instruction. For example, if a control instruction includes an updated route that instructs the vehicle to take an exit of a freeway, the autonomous mode module 4010 may determine actions that cause the vehicle to slightly decelerate and veer to the right.

In response to determining one or more actions, the autonomous mode module 4010 outputs the action to the vehicle control module 4020. The vehicle control module 4020 receives an action and outputs commands to one or more various vehicle systems. For example, in response to receiving a "veer right" action, the vehicle control module 4020 instructs the steering system to turn the steering column of the vehicle slightly to the right. In another example, in response to receiving a "decelerate" action, the vehicle control module 4020 may instruct the power system to reduce the power output by one or more motors of the vehicle. The vehicle control module 4020 may determine commands corresponding to a received action in any suitable manner. For example, the vehicle control module 4020 may utilize a lookup table that relates actions to commands. In other implementations, the vehicle control module 4020 may utilize a set of rules that output one or more commands in response to an action. In response to determining a command, the vehicle control module 4020 issues the command to the corresponding vehicle system.

Figure 5:
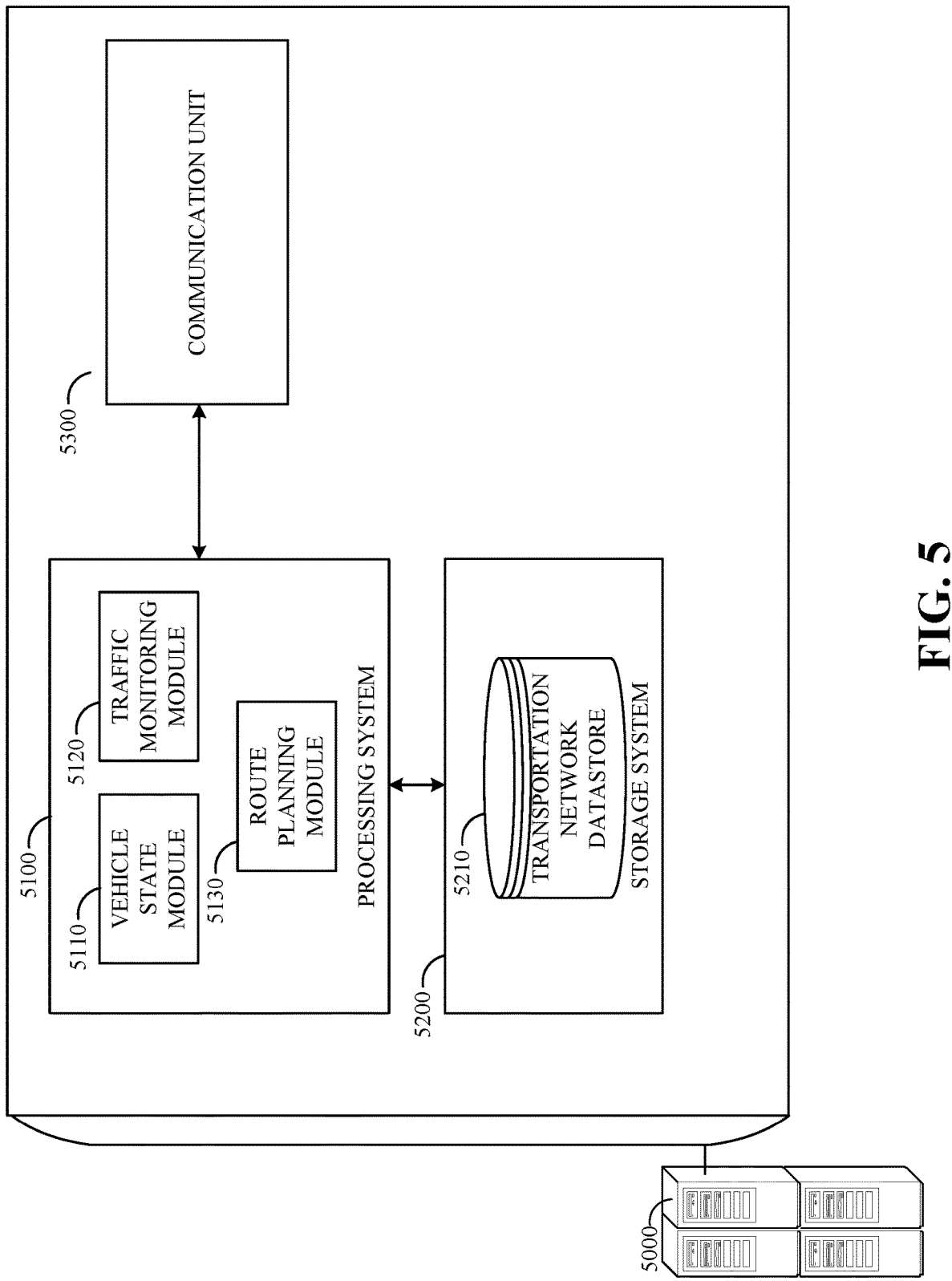
FIG. 5 is a schematic of an example set of components of a controller apparatus that routes a plurality of autonomous vehicles according to some implementations of the present disclosure.

FIG. 5 illustrates an example configuration of a controller apparatus 5000 (e.g., the controller apparatuses of FIGS. 2, 3A, 3B). The controller apparatus 5000 may include a processing system 5100 that includes one or more processors that operate in a distributed or individual manner. The processing system 5100 may execute a vehicle state module 5110, a traffic monitoring module 5120, and a route planning module 5130. The processing system 5100 may execute additional components not shown. The controller apparatus 5000 may further include a storage system 5200. The storage system 5200 may include one or more storage devices (e.g., flash memory devices, hard disk drives, or the like). The storage devices may be located at the same physical location as one another or may be distributed and connected via a network. The storage system 5200 may store a transportation network datastore 5210. The controller apparatus 5000 may further include a communication unit 5300 that effectuates wired and/or wireless communication between one or more external devices (e.g., autonomous vehicles) and the controller apparatus 5000 via a communication network (e.g., the Internet and/or a cellular network).

The transportation network datastore 5210 stores transportation network data. Transportation network data may be any data that describes features of a transportation network. The transportation network data may define roadways (e.g., streets, highways, bi-ways, alleys, etc.), directions of travels along the roadways, right of ways on the roadways, traffic signage (e.g., yield signs, stop signs, etc.), traffic light data, lane data (e.g., number of lanes, merge points, etc.), speed limits along the roadway, expected speeds or velocities along the roadway, ranges of expected speeds or velocities along the roadway, known obstacles, external objects, and other suitable data. In some implementations, the transportation network data may be organized in a database that is keyed by geolocations. In this way, the traffic monitoring module 5120 and/or the route planning module 5130 may retrieve transportation network data relating to a path of a vehicle based on a location of the vehicle.

The vehicle state module 5110 is configured to monitor the vehicle state of respective autonomous vehicles that are in communication with the controller apparatus 5000. In some implementations, the vehicle state module 5110 maintains a vehicle state data object instance for each autonomous vehicle in communication with the controller apparatus 5000. A vehicle state data object may be any class, container, and/or data structure that is configured to maintain vehicle state data. According to some implementations, a vehicle state data object is configured to store a current location of a vehicle, a current route of the vehicle, a destination of the vehicle, a number of passengers in the vehicle, a current task of the vehicle, a priority of the vehicle, a power level (e.g., charge or fuel remaining) of the vehicle, a priority value of the vehicle, and/or any other suitable data types. In some implementations, a vehicle state data object may further include computer-executable instructions that are configured to perform one or more operations relating to the maintained vehicle state data. For example, a vehicle state data object may include instructions for reporting when the vehicle state data provided by an autonomous vehicle indicates that the autonomous vehicle is not traveling at an expected speed or velocity or when it is unexpectedly stopped. Additionally or alternatively, a vehicle state data object may include instructions for reporting when a vehicle has reached its destination.

In some implementations, the vehicle state module 5110 instantiates a vehicle state data object instance from a vehicle state data object upon an autonomous vehicle initiating communication with the controller apparatus 5000. For example, upon the autonomous vehicle powering on and initiating a communication session with the controller apparatus 5000, the controller apparatus 5000 may instantiate a vehicle state data object instance. Once instantiated, the vehicle state data object instance may receive vehicle state data from the corresponding autonomous vehicle and may maintain the vehicle state data. For example, upon initializing, an autonomous vehicle may transmit vehicle state data, which may include but is not limited to, the current location of the vehicle, the destination of the vehicle, the current route of the vehicle, the number of passengers in the vehicle, and the task of the vehicle (e.g., purpose of the trip) to the controller apparatus 5000. The vehicle state data object instance corresponding to the communicating vehicle may update the vehicle state data maintained therein based on the received vehicle state data.

In some implementations, the vehicle state data object instances are embodied in respective containers. In these implementations, each container may correspond to a different vehicle and may be configured to communicate directly with the autonomous vehicle to which the container corresponds. In this way, each container may receive vehicle state data from and transmit control instructions to the autonomous vehicle to which it corresponds. During initialization, the container may establish a communication session with the autonomous vehicle. As the vehicle traverses the transportation network, the vehicle may transmit its current location to the container. The container may maintain the current location of the vehicle, as well as any other vehicle state data provided by the autonomous vehicle. For example, the container may maintain the number of passengers in a vehicle, the route of the vehicle, the destination of the vehicle, the task of the vehicle, and the like.

In some implementations, each vehicle state data object instance may be configured to output an indication when the vehicle is not traveling at an expected velocity. In these implementations, the vehicle state data object instance may obtain transportation network data from the transportation network datastore 5210 corresponding to the current location of the vehicle. The transportation network data corresponding to the current location may indicate a speed limit and/or expected range of velocities at the segment of the transportation network on which the vehicle is currently traveling. The vehicle state data object instance may determine the speed or velocity of the vehicle based on the vehicle state data received from the vehicle. If the speed or velocity is much less than the speed limit and/or expected range of velocities, the vehicle state data object instance may output a notification indicating that the vehicle is likely encountering a traffic condition. For example, if the vehicle is traveling on a freeway that has a seventy mile-per-hour speed limit, but the vehicle is not moving or traveling very slowly, the current location indicated in the vehicle state data will not change over a period of time (e.g., over the course of one or two minutes) or will change relatively slowly. In the case that the vehicle state data object instance detects that the vehicle is not moving/moving slower than expected, the vehicle state data object instance may issue a notification that the vehicle has likely encountered a traffic condition.

In some implementations, the traffic monitoring module 5120 monitors the vehicle state data of the various autonomous vehicles traversing the transportation network to determine the existence of traffic conditions. For example, the traffic monitoring module 5120 may monitor the vehicle state data object instances for notifications indicating that one or more autonomous vehicles have likely encountered a traffic condition. The traffic monitoring module 5120 can determine the current locations of each autonomous vehicle that has likely encountered a traffic condition. If the traffic monitoring module 5120 determines that a requisite number of vehicles have likely encountered a traffic condition at or near the same location, the traffic monitoring module 5120 determines an occurrence of a traffic condition. Upon determining the occurrence of a traffic condition, the traffic monitoring module 5120 can determine a location (e.g., an estimated geolocation) of the traffic condition. The traffic monitoring module 5120 can output a location (e.g., an estimated geolocation) of the traffic condition to the route planning module 5130.

In some implementations, the traffic monitoring module 5120 receives external data from various devices and sensors (e.g., video cameras, motion sensors, LIDAR sensors, or the like) disposed along the transportation network that can report traffic backups, accidents, construction, and/or other traffic conditions. In these implementations, the traffic monitoring module 5120 may receive a notification of a traffic condition from one or more of the sensors. The notification may include a location (e.g., an estimated geolocation) of the traffic condition. In response to receiving the notification, the traffic monitoring module 5120 may output the location (e.g., the estimated geolocation) of the traffic condition to the route planning module.

The route planning module 5130 receives a location of a traffic condition and reroutes autonomous vehicles that may be rerouted. In some implementations, the route planning module 5130 determines a group of autonomous vehicles that are: traversing the transportation network; on a current route that intersects a detected traffic condition; and are eligible to be rerouted around the traffic condition. The route planning module 5130 may determine that a vehicle is eligible to be rerouted around the traffic condition if there exists at least one different path (e.g., an exit or a turn to another road) that may be taken to avoid the traffic condition.

In some implementations, the route planning module 5130 may query each vehicle state data object instance with the location of the traffic condition to determine which autonomous vehicles have a current route that intersects the traffic condition. Of those autonomous vehicles, the route planning module 5130 can query the transportation network datastore to determine which of the autonomous vehicles that are eligible to be rerouted to avoid the traffic condition. The determined vehicles are included in an initial group of autonomous vehicles.

The route planning module 5130 is further configured to separate the initial group of autonomous vehicles into subgroups of autonomous vehicles based on priority values of each autonomous vehicle in the initial group of autonomous vehicles. In some implementations, the priority value of an autonomous vehicle is assigned to the autonomous vehicle upon the autonomous vehicle embarking on its route. In other implementations, the priority value of an autonomous vehicle may be determined when the autonomous is included in an initial group of autonomous vehicles. The priority value of an autonomous vehicle may be determined based on one or more factors. For example, the priority value of an autonomous vehicle may be based on a number of passengers (if any) in the autonomous vehicle 3100, the intended purpose of the autonomous vehicle (e.g., passenger drop off, delivery, parking, or charging), whether the autonomous vehicle needs to be charged or fueled, an urgency value requested by a passenger, or the like. In some implementations, the route planning module 5130 (or another component) utilizes a rules-based approach to determine the priority value. For example, passenger vehicles transporting one or more passengers may be assigned the highest priority value, commercial autonomous vehicles and/or passengerless autonomous vehicles may be assigned an intermediate priority value, and autonomous vehicles requiring a charge/refuel are given a lower priority value. In other implementations, the route planning module 5130 (or another component) may utilize a scoring function to determine the priority value of each autonomous vehicle. Once assigned priority values, the route planning module 5130 may separate the autonomous vehicles into subgroups. The route planning module 5130 may generate a first subgroup of autonomous vehicles having the highest priority value, whereby the first subgroup may be rerouted on the fastest route around the traffic condition. The route planning module 5130 may generate a second subgroup of autonomous vehicles having the intermediate priority value, whereby the second subgroup may be rerouted on a slower route around the traffic condition. In some scenarios, the route planning module 5130 may generate a third subgroup of autonomous vehicles having the lowest priority value, whereby the third subgroup may be rerouted on a slower route that has more charging/refueling options along the selected route.

Once separated into subgroups, the route planning module 5130 determines an avoidance waypoint for each subgroup. An avoidance waypoint may correspond to a turn or exit that allows the subgroup of autonomous vehicles to avoid the traffic condition. The route planning module 5130 may determine the different routes around the traffic condition, whereby each of the different routes includes a different avoidance waypoint, such that the vehicles are not all routed to another bottleneck. Of the potential routes, the route planning module 5130 selects a first avoidance waypoint corresponding to the fastest route to the first subgroup, a second avoidance waypoint corresponding to a slower route to the second subgroup, and a third avoidance waypoint corresponding to a slower route with charging/refueling options subgroup to the third subgroup. It is noted that the route planning module 5130 may determine the avoidance waypoints in any suitable manner. For example, the route planning module 5130 may determine the avoidance waypoints to minimize the route time for each respective subgroup, whereby subgroups with higher priority values are assigned avoidance waypoints corresponding to the fastest route and the subgroups having lower priority values are assigned avoidance waypoints corresponding to slower routes. In another example, the route planning module 5130 may determine the avoidance waypoints to minimize the driving distance for each respective subgroup, whereby subgroups with higher priority values are assigned avoidance waypoints corresponding to the shortest route and the subgroups having lower priority values are assigned avoidance waypoints corresponding to relatively longer routes.

Upon determining the avoidance waypoints for each subgroup, the route planning module 5130 can assign an updated route to each of the autonomous vehicles in the subgroup, such that each updated route passes through the avoidance waypoint assigned to the subgroup. The route planning module 5130 can determine whether an autonomous vehicle is to be routed back to the original route (e.g., back onto the highway after the traffic condition) or onto a different route altogether (e.g., taking other roads to reach the destination). The route planning module 5130 may utilize any routing techniques to determine the updated route for each vehicle. For example, the route planning module 5130 may employ Dijkstra's algorithm to determine the route for each vehicle. The route planning module 5130 may utilize the destination of the vehicle and the avoidance waypoint as input parameters to determine the updated route of the autonomous vehicle. Upon determining the updated route of an autonomous vehicle, the route planning module 5130 may generate a control instruction that contains the updated route and may transmit the control instruction to the autonomous vehicle. The routing planning module 5130 may generate a control instruction containing an updated route for each autonomous vehicle in each subgroup.

The route planning module 5130 may perform other operations not herein discussed. For example, the route planning module 5130 may determine routes for the vehicles given their destination and starting location, upon a vehicle initially engaging in a trip.

Figure 6:
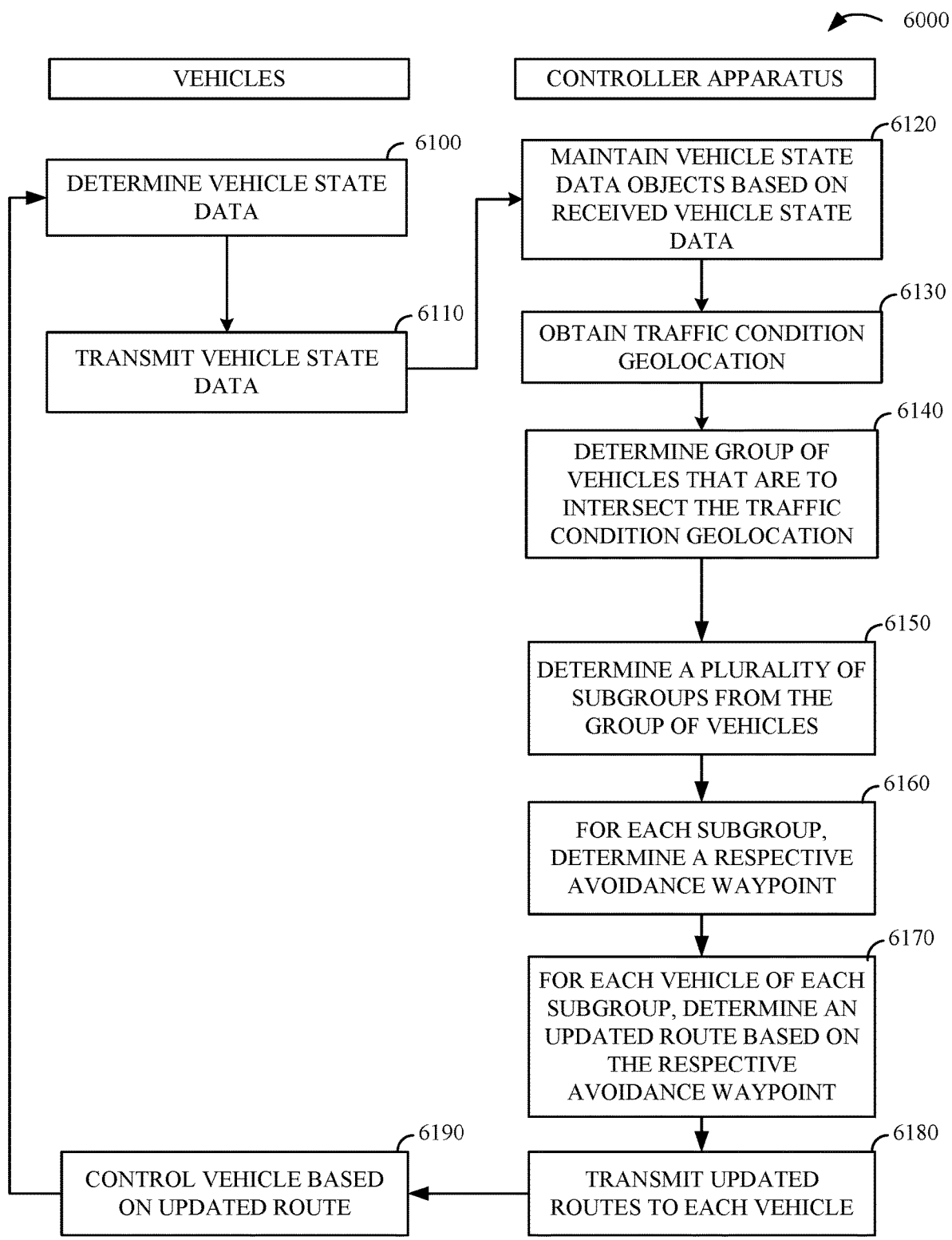
FIG. 6 is a flow chart illustrating an example set of operations of a method for controlling a plurality of autonomous vehicles that are on a route that intersects a traffic condition

FIG. 6 illustrates an example set of operations of a method 6000 for controlling a plurality of autonomous vehicles that are on a route that intersects a traffic condition. The method 6000 is described with respect to a controller apparatus (e.g., controller apparatus 5000 of FIG. 5) and two or more autonomous vehicles (e.g., autonomous vehicle 1000 and vehicle control system 4000 of FIG. 4). The method 6000 may be performed by any suitable system of computing devices.

At 6100, each autonomous vehicle determines its respective vehicle state data. Each autonomous vehicle receives sensor data from a respective sensor system of the autonomous vehicle. For example, an autonomous vehicle may receive sensor data from a global positioning system (GPS) sensor, optical sensors including light detection and ranging sensors (LIDAR), video sensors, audio sensors, motion sensors (e.g., accelerometers and/or gyroscopes), temperature sensors, and/or any other suitable vehicle sensors. The autonomous vehicle may collect this data continuously and/or at set intervals (e.g., every millisecond, half second, or second).

At 6110, each autonomous vehicle transmits its vehicle state data to a controller apparatus. Each autonomous vehicle may transmit its vehicle state data via a communication network (e.g., the Internet, a cellular network, or any other suitable communication network). An autonomous vehicle may begin transmitting its vehicle state data upon the autonomous vehicle being powered on. Upon being powered on, the autonomous vehicle may initiate a communication session with the controller apparatus. In response to initiating a communication session, an autonomous vehicle may begin transmitting its vehicle state data. Each autonomous vehicle may be configured to stream the vehicle state data, such that the vehicle state data is being continuously or nearly continuously transmitted.

At 6120, the controller apparatus maintains vehicle state data objects based on the received vehicle state data from the respective autonomous vehicles. The controller apparatus is configured to monitor the vehicle state data of the collection of autonomous vehicles that are in communication with the controller apparatus. In some implementations, the controller apparatus maintains a vehicle state data object instance for each autonomous vehicle in communication with the controller apparatus. A vehicle state data object may be any class, container, and/or data structure that is configured to maintain vehicle state data. In some implementations, a vehicle state data object may include computer-executable instructions that are configured to perform one or more operations relating to the maintained vehicle state data.

According to some implementations, a vehicle state data object is configured to maintain a current location of a vehicle, a current route of the vehicle, a destination of the vehicle, a number of passengers in the vehicle, a current task of the vehicle, a priority of the vehicle, a power level (e.g., charge or fuel remaining) of the vehicle, a priority value of the vehicle, and/or any other suitable data types.

In some implementations, the controller apparatus instantiates a vehicle state data object instance from a vehicle state data object upon an autonomous vehicle initiating communication with the controller apparatus. For example, upon the autonomous vehicle powering on and initiating a communication session with the controller apparatus, the controller apparatus may instantiate a vehicle state data object instance. Once instantiated, the vehicle state data object instance may receive vehicle state data from the corresponding autonomous vehicle and may maintain the vehicle state data. For example, the controller apparatus may receive vehicle state data that may include, but is not limited to, the current location of the vehicle, the destination of the vehicle, the current route of the vehicle, the number of passengers in the vehicle, and the task of the vehicle (e.g., purpose of the trip) from each autonomous vehicle. The vehicle state data object instance corresponding to each respective communicating autonomous vehicle may update the vehicle state data maintained therein based on the received vehicle state data.

In some implementations, the vehicle state data object instances are embodied in respective containers. In these implementations, each container may correspond to a different vehicle and may be configured to communicate directly with the autonomous vehicle to which the container corresponds. In this way, each container may receive vehicle state data from and transmit control instructions to the autonomous vehicle to which it corresponds. During initialization, the container may establish a communication session with the autonomous vehicle. As the autonomous vehicle traverses the transportation network, the autonomous vehicle may transmit its current location to the container. The container may maintain the current location of the vehicle, as well as any other vehicle state data provided by the autonomous vehicle. For example, the container may maintain the number of passengers in the autonomous vehicle, the route of the autonomous vehicle, the destination of the autonomous vehicle, the task of the autonomous vehicle, and the like. As an autonomous vehicle continues to update its vehicle state data, the container may continue to receive and update the vehicle state data of the communicating autonomous vehicle.

At 6130, the controller apparatus obtains a traffic condition location. In some implementations, the controller apparatus may obtain the traffic condition location by monitoring the vehicle state data of the various autonomous vehicles traversing the transportation network to determine the existence of traffic conditions. For example, the controller apparatus may monitor the autonomous vehicle state data object instances for notifications indicating that one or more autonomous vehicles have likely encountered a traffic condition. The controller apparatus can determine the current locations of each autonomous vehicle that has likely encountered a traffic condition. If the controller apparatus determines that a requisite number of autonomous vehicles have likely encountered a traffic condition at or near the same location, the controller apparatus determines an occurrence of a traffic condition. Upon determining the occurrence of a traffic condition, the controller apparatus can estimate a geolocation of the traffic condition.

In some implementations, the controller apparatus receives external data from various devices and sensors (e.g., video cameras, motion sensors, LIDAR sensors, or the like) disposed along the transportation network that can report traffic backups, accidents, construction, and/or other traffic conditions. In these implementations, the controller apparatus may receive a notification of a traffic condition from one or more of the sensors. The notification may include a location (e.g., an estimated geolocation) of the traffic condition.

At 6140, the controller apparatus determines a group of autonomous vehicles that are set to intersect the traffic condition location. In some implementations, the controller apparatus determines a group of autonomous vehicles that are: traversing the transportation network; on a current route that intersects a detected traffic condition; and are eligible to be rerouted around the traffic condition. The controller apparatus may determine that a vehicle is eligible to be rerouted around the traffic condition when there exists at least one different path (e.g., an exit or a turn to another road) that may be taken to avoid the traffic condition. In some implementations, the controller apparatus may query each vehicle state data object instance with the location of the traffic condition to determine which autonomous vehicles have a current route that intersects the traffic condition. Of those autonomous vehicles, the controller apparatus can query the transportation network datastore to determine which of the autonomous vehicles that are eligible to be rerouted to avoid the traffic condition. The determined autonomous vehicles are included in an initial group of autonomous vehicles.

At 6150, the controller apparatus determines a plurality of subgroups from the group of vehicles based on the vehicle state data. In some implementations, the controller apparatus determines the subgroups of autonomous vehicles based on priority values of each respective autonomous vehicle in the initial group of autonomous vehicles. The priority value of an autonomous vehicle may be determined using the vehicle state data of the autonomous vehicle. In some implementations, the priority value of an autonomous vehicle is assigned to the autonomous vehicle upon the autonomous vehicle embarking on its route. In other implementations, the priority value of an autonomous vehicle may be determined when it is included in an initial group of autonomous vehicles. The priority value of a vehicle may be determined based on one or more factors. For example, the priority value of an autonomous vehicle may be based on a number of passengers (if any) in the autonomous vehicle, the intended purpose of the autonomous vehicle (e.g., passenger drop off, delivery, parking, or charging), whether the autonomous vehicle needs to be charged or fueled, an urgency value requested by a passenger, or the like. In some implementations, the controller apparatus utilizes a rules-based approach to determine the priority value. For example, passenger vehicles transporting one or more passengers may be assigned the highest priority value, commercial vehicles and/or passenger-less vehicles may be assigned an intermediate priority value, and autonomous vehicles requiring a charge/refuel are given a lower priority value. In other implementations, the controller apparatus may utilize a scoring function to determine the priority value of an autonomous vehicle. Once assigned priority values, the controller apparatus may separate the vehicles into subgroups. The controller apparatus may generate a first subgroup of autonomous vehicles having the highest priority value, whereby the first subgroup may be rerouted on the fastest route around the traffic condition. The controller apparatus may generate a second subgroup of autonomous vehicles having the intermediate priority value, whereby the second subgroup may be rerouted on a slower route around the traffic condition. In some scenarios controller apparatus may generate a third subgroup of autonomous vehicles having the lowest priority value, whereby the third subgroup may be rerouted on a slower route that has more charging/refueling options along the selected route.

At 6160, the controller apparatus determines a respective avoidance waypoint for each subgroup. Once separated into subgroups, the controller apparatus determines an avoidance waypoint for each subgroup. An avoidance waypoint may correspond to a turn or exit that allows the subgroup of autonomous vehicles to avoid the traffic condition. The controller apparatus may determine the different routes around the traffic condition, whereby each of the different routes includes a different avoidance waypoint, such that the autonomous vehicles are not all routed to another bottleneck. Of the potential routes, the controller apparatus selects a first avoidance waypoint corresponding to the fastest route to the first subgroup, a second avoidance waypoint corresponding to a slower route to the second subgroup, and, if necessary, a third avoidance waypoint corresponding to a slower route with charging subgroup to the third subgroup.

At 6170, the controller apparatus determines, for each autonomous vehicle in each respective subgroup, an updated route based on the respective waypoint of the subgroup. Upon determining the avoidance waypoints for each subgroup, the controller apparatus can assign an updated route to each of the autonomous vehicles in the subgroup, such that each updated route passes through the avoidance waypoint assigned to the subgroup. The controller apparatus can determine whether an autonomous vehicle is to be routed back to the original route (e.g., back onto the highway after the traffic condition) or onto a different route altogether (e.g., taking other roads to reach the destination). The controller apparatus may utilize any routing techniques to determine the updated route for each vehicle. For example, the controller apparatus may employ Dijkstra's algorithm to determine the route for each vehicle. The controller apparatus may utilize the destination of the vehicle and the avoidance waypoint as input parameters to determine the updated route of the vehicle. a control instruction containing an updated route for each vehicle in each subgroup.

At 6180, the controller apparatus transmits an updated route to each respective autonomous vehicle. Upon determining the updated route of a vehicle, the controller apparatus may generate a control instruction that contains the updated route and may transmit the control instruction to the vehicle.

At 6190, each autonomous vehicle receiving an updated route controls the vehicle based on the updated route. An autonomous vehicle may receive the control instruction containing the updated route and may set a new course based on the updated route. The autonomous vehicle may determine one or more actions to undertake in order to change its course. The autonomous vehicle may continue to determine and transmit its vehicle state data until the destination of the autonomous vehicle is reached.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

As used herein, the terminology "computer" or "computing device" includes any unit, or combination of units, capable of performing any method, or any portion or portions thereof, disclosed herein. As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element"

indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

What is claimed is:

1. A method, comprising:
   maintaining, by one or more processors of a vehicle control server, a plurality of vehicle state data object instances that respectively correspond to a plurality of autonomous vehicles traversing a vehicle transportation network, wherein each vehicle state data object instance indicates a current location corresponding to a current location of the respective autonomous vehicle and a current route of the respective autonomous vehicle;
   obtaining, by the one or more processors, a traffic condition location, wherein the traffic condition location indicates a location along the vehicle transportation network where traffic is currently impeded;
   determining, by the one or more processors, a group of autonomous vehicles from the plurality of autonomous vehicles based on the traffic condition location and the current route defined in each of the plurality of vehicle state data object instances, wherein the group of autonomous vehicles includes autonomous vehicles where the current route of the autonomous vehicle intersects the traffic condition location;
   determining, by the one or more processors, two or more subgroups of autonomous vehicles including a first subgroup of autonomous vehicles and a second subgroup of autonomous vehicles from the group of autonomous vehicles based on the plurality of vehicle state data object instances;
   for each subgroup of autonomous vehicles of the two or more subgroups:
      determining, by the one or more processors, a respective avoidance waypoint corresponding to the subgroup, wherein the respective avoidance waypoint defines a respective geolocation that is not on the current route of any of the autonomous vehicles in the subgroup of autonomous vehicles and is different from respective waypoints of each other subgroup of autonomous vehicles of the two or more subgroups; and
      for each autonomous vehicle in the subgroup:
         determining, by the one or more processors, an updated route based on the current route of the autonomous vehicle and the respective avoidance waypoint, wherein the updated route does not intersect traffic condition location;
         generating, by the one or more processors, a control instruction based on the updated route; and
         transmitting, by the one or more processors, the control instruction to the autonomous vehicle, wherein the control instruction causes the autonomous vehicle to travel to the respective avoidance waypoint.

2. The method of claim 1, wherein determining the group of autonomous vehicles comprises:
   identifying any autonomous vehicles having a respective current route that intersects the traffic condition location; and
   for each of the identified autonomous vehicles:
      determining whether the identified autonomous vehicle is eligible to be rerouted to avoid the traffic condition location; and
      when the identified autonomous vehicle is eligible to be rerouted, including a reference to the identified autonomous vehicle in the group of autonomous vehicles.

3. The method of claim 1, wherein determining the two or more subgroups of autonomous vehicles comprises:
   for each autonomous vehicle in the group of autonomous vehicles, assigning a priority value to the autonomous vehicle based on a plurality of features of the autonomous vehicle indicated by the vehicle state data object instance of the autonomous vehicle; and
   generating the two or more subgroups based on the respective priority values of each autonomous vehicle in the group of autonomous vehicles.

4. The method of claim 3, wherein, for each respective autonomous vehicle in the plurality of autonomous vehicles, the respective vehicle state data object instance of the respective autonomous vehicle includes a vehicle task indicator indicating a current task of the respective autonomous vehicle, and wherein the priority value of each respective autonomous vehicle in the group of autonomous vehicles is based on the vehicle task indicator included in the vehicle state data object instance of the respective autonomous vehicle.

5. The method of claim 3, wherein, for each respective autonomous vehicle in the plurality of autonomous vehicles, the respective vehicle state object instance of the respective autonomous vehicle includes a passenger value indicating whether there are passengers in the respective autonomous vehicle, and wherein the priority value of each respective autonomous vehicle in the group of autonomous vehicles is based on the passenger value included in the vehicle state data object instance of the respective autonomous vehicle.

6. The method of claim 3, wherein for each respective autonomous vehicle in the plurality of autonomous vehicles, the respective vehicle state object instance of the respective autonomous vehicle includes a charge value indicating a remaining amount of charge in a vehicle power supply of the respective autonomous vehicle, and wherein the priority value of each respective autonomous vehicle in the group of autonomous vehicles is based on the charge value included in the vehicle state data object instance of the respective autonomous vehicle.

7. The method of claim 1, wherein determining the two or more subgroups of autonomous vehicles comprises:
for each autonomous vehicle in the group of autonomous vehicles, assigning a priority value to the autonomous vehicle based on at least two features from a plurality of features of the autonomous vehicle indicated by the vehicle state data object instance of the autonomous vehicle, wherein the plurality of features includes a vehicle task indicator indicating a current task of the respective autonomous vehicle, a passenger value indicating whether there are passengers in the respective autonomous vehicle, and a charge value indicating a remaining amount of charge in a vehicle power supply of the respective autonomous vehicle; and
generating the two or more subgroups based on the respective priority values of each autonomous vehicle in the group of autonomous vehicles.

8. The method of claim 7, wherein generating the two or more subgroups includes:
in response to a determination that the respective group of autonomous vehicles includes an autonomous vehicle for which the passenger value indicates that there are passengers in the autonomous vehicle, assigning a highest priority to the respective group of autonomous vehicles;
in response to a determination that the respective group of autonomous vehicles omits an autonomous vehicle for which the passenger value indicates that there are passengers in the autonomous vehicle:
in response to a determination that the respective group of autonomous vehicles includes an autonomous vehicle for which the charge value indicates that charging is not required, assigning an intermediate priority to the respective group of autonomous vehicles, wherein the intermediate priority is lower than the high priority; and
in response to a determination that the respective group of autonomous vehicles includes an autonomous vehicle for which the charge value indicates that charging is required, assigning a low priority to the respective group of autonomous vehicles, wherein the intermediate priority is higher than the low priority.

9. A controller apparatus, comprising:
a storage system;
a communication unit configured to communicate with a plurality of autonomous vehicles via a communication network; and
a processing system that includes one or more processors that execute computer-readable instructions that, when executed, cause the processing system to:
maintain a plurality of vehicle state data object instances that respectively correspond to the plurality of autonomous vehicles traversing a vehicle transportation network, wherein each vehicle state data object instance indicates a current location corresponding to a current location of the respective autonomous vehicle and a current route of the respective autonomous vehicle;
obtain a traffic condition location, wherein the traffic condition location indicates a location along the vehicle transportation network where traffic is currently impeded;
determine a group of autonomous vehicles from the plurality of autonomous vehicles based on the traffic condition location and the current route defined in each of the plurality of vehicle state data object instances, wherein the group of autonomous vehicles includes autonomous vehicles where the current route of the autonomous vehicle intersects the traffic condition location;
determine two or more subgroups of autonomous vehicles including a first subgroup of autonomous vehicles and a second subgroup of autonomous vehicles from the group of autonomous vehicles based on the plurality of vehicle state data object instances;
for each subgroup of autonomous vehicles of the two or more subgroups:
determine a respective avoidance waypoint corresponding to the subgroup, wherein the respective avoidance waypoint defines a respective geolocation that is not on the current route of any of the autonomous vehicles in the subgroup of autonomous vehicles and is different from respective waypoints of each other subgroup of autonomous vehicles of the two or more subgroups; and
for each autonomous vehicle in the subgroup:
determine an updated route based on the current route of the autonomous vehicle and the respective avoidance waypoint, wherein the updated route does not intersect traffic condition location;
generate a control instruction based on the updated route; and
transmit the control instruction to the autonomous vehicle, wherein the control instruction causes the autonomous vehicle to travel to the respective avoidance waypoint.

10. The controller apparatus of claim 9, wherein determining the group of autonomous vehicles comprises:
identifying any autonomous vehicles having a respective current route that intersects the traffic condition location; and
for each of the identified autonomous vehicles:
determining whether the identified autonomous vehicle is eligible to be rerouted to avoid the traffic condition location; and
when the identified autonomous vehicle is eligible to be rerouted, including a reference to the identified autonomous vehicle in the group of autonomous vehicles.

11. The controller apparatus of claim 9, wherein determining the two or more subgroups of autonomous vehicles comprises:
for each autonomous vehicle in the group of autonomous vehicles, assigning a priority value to the autonomous vehicle based on a plurality of features of the autonomous vehicle indicated by the vehicle state data object instance of the autonomous vehicle; and
generating the two or more subgroups based on the respective priority values of each autonomous vehicle in the group of autonomous vehicles.

12. The controller apparatus of claim 11, wherein, for each respective autonomous vehicle in the plurality of autonomous vehicles, the respective vehicle state data object instance of the respective autonomous vehicle includes a vehicle task indicator indicating a current task of the respective autonomous vehicle, and wherein the priority value of each respective autonomous vehicle in the group of autonomous vehicles is based on the vehicle task indicator included in the vehicle state data object instance of the respective autonomous vehicle.

13. The controller apparatus of claim 11, wherein, for each respective autonomous vehicle in the plurality of autonomous vehicles, the respective vehicle state object instance of the respective autonomous vehicle includes a passenger value indicating whether there are passengers in the respective autonomous vehicle, and wherein the priority value of each respective autonomous vehicle in the group of autonomous vehicles is based on the passenger value included in the vehicle state data object instance of the respective autonomous vehicle.

14. The controller apparatus of claim 11, wherein for each respective autonomous vehicle in the plurality of autonomous vehicles, the respective vehicle state object instance of the respective autonomous vehicle includes a charge value indicating a remaining amount of charge in a vehicle power supply of the respective autonomous vehicle, and wherein the priority value of each respective autonomous vehicle in the group of autonomous vehicles is based on the charge value included in the vehicle state data object instance of the respective autonomous vehicle.

15. The controller apparatus of claim 9, wherein determining the two or more subgroups of autonomous vehicles comprises:
   for each autonomous vehicle in the group of autonomous vehicles, assigning a priority value to the autonomous vehicle based on at least two features from a plurality of features of the autonomous vehicle indicated by the vehicle state data object instance of the autonomous vehicle, wherein the plurality of features includes a vehicle task indicator indicating a current task of the respective autonomous vehicle, a passenger value indicating whether there are passengers in the respective autonomous vehicle, and a charge value indicating a remaining amount of charge in a vehicle power supply of the respective autonomous vehicle; and
   generating the two or more subgroups based on the respective priority values of each autonomous vehicle in the group of autonomous vehicles.

16. The controller apparatus of claim 15, wherein generating the two or more subgroups includes:
   in response to a determination that the respective group of autonomous vehicles includes an autonomous vehicle for which the passenger value indicates that there are passengers in the autonomous vehicle, assigning a highest priority to the respective group of autonomous vehicles;
   in response to a determination that the respective group of autonomous vehicles omits an autonomous vehicle for which the passenger value that there are passengers in the autonomous vehicle:
      in response to a determination that the respective group of autonomous vehicles includes an autonomous vehicle for which the charge value indicates that charging is not required, assigning an intermediate priority to the respective group of autonomous vehicles, wherein the intermediate priority is lower than the high priority; and
      in response to a determination that the respective group of autonomous vehicles includes an autonomous vehicle for which the charge value indicates that charging is required, assigning a low priority to the respective group of autonomous vehicles, wherein the intermediate priority is higher than the low priority.

* * * * *